United States Patent [19]
Lee

[11] Patent Number: 5,737,316
[45] Date of Patent: Apr. 7, 1998

[54] METHOD AND DEVICE FOR DETERMINING LINK STATUS IN A COMPUTER NETWORK

[75] Inventor: Jack Lee, Marlborough, Mass.

[73] Assignee: 3Com Corporation, Santa Clara, Calif.

[21] Appl. No.: 432,781

[22] Filed: May 2, 1995

[51] Int. Cl.⁶ .................. H04J 1/16; H04J 3/14
[52] U.S. Cl. .................. 370/248; 370/252; 379/22
[58] Field of Search ................ 370/242, 241, 370/248, 243, 244, 245, 249, 252; 379/1, 6, 21, 22, 24, 26; 375/224, 257, 259, 340; 324/691, 697; 371/20.1, 22.1, 22.3

[56] References Cited

U.S. PATENT DOCUMENTS

| | | | |
|---|---|---|---|
| 3,612,782 | 10/1971 | Wilfred | 179/175.3 |
| 4,630,228 | 12/1986 | Tarczy-Hornoch et al. | 364/576 |
| 5,128,619 | 7/1992 | Bjork et al. | 324/533 |
| 5,361,293 | 11/1994 | Czerwiec | 379/27 |
| 5,465,287 | 11/1995 | Egozi | 379/5 |
| 5,548,222 | 8/1996 | Jensen et al. | 324/628 |
| 5,586,111 | 12/1996 | Wise | 370/241 |

*Primary Examiner*—Douglas W. Olms
*Assistant Examiner*—A. Bnimoussa
*Attorney, Agent, or Firm*—McGlew and Tuttle

[57] ABSTRACT

A process for detecting link status in a computer network where the link and the load at the end of the link have a matched characteristic impedance. The data to be transmitted over the link is converted into a substantially continuous, random signal with a substantially known spectrum. This signal is transmitted over a link from a first end to the second or receiving end of the link. The first end of the link is analyzed for a reflection signal caused by a mismatch of the characteristic impedance of the link and the termination of the link. The link is identified as satisfactory if the reflection signal represents a substantial match between the characteristic impedance of the link and the characteristic impedance of the termination of the link. The link is identified as defective if the reflection signal represents a mismatch between the characteristic impedance of the link and the termination.

17 Claims, 22 Drawing Sheets

— PHY TX & PHY RX CAN SENSE BREAK & SHORT* ON EACH LINK

— P_LINK=1 IF TX (PRIM) IS OK AND RX (PRIM) IS OK
   S_LINK=1 IF TX (SEC) IS OK AND RX (SEC) IS OK

— SELECT => SECONDARY IF P_LINK=0 AND S_LINK=1
   SELECT => PRIMARY IF P_LINK=1 (S_LINK IS DON'T CARE)
   SELECT => PRIMARY IF P_LINK=0 AND S_LINK=0

LAYER 2 TO LAYER 2

FIGURE 8  LAYER 2 TO LAYER 2

— SWITCHOVER IS MADE AT PHYSICAL LAYER (PHY OR LAYER 1)

— MAC IS NOT PART OF THE REDUNDANT LINK

*FIGURE 9*     ALTERNATIVE: LAYER 2 TO LAYER 2

LAYER 2 TO LAYER 1

— NO EXTRA REQUIREMENT NEEDED FOR LAYER 1 PORTS IN THE MULTIPORT REPEATERS model of cat 5 100 M reflection coefficient or return loss
- magnitude in dB
load terminated with 105 ohms
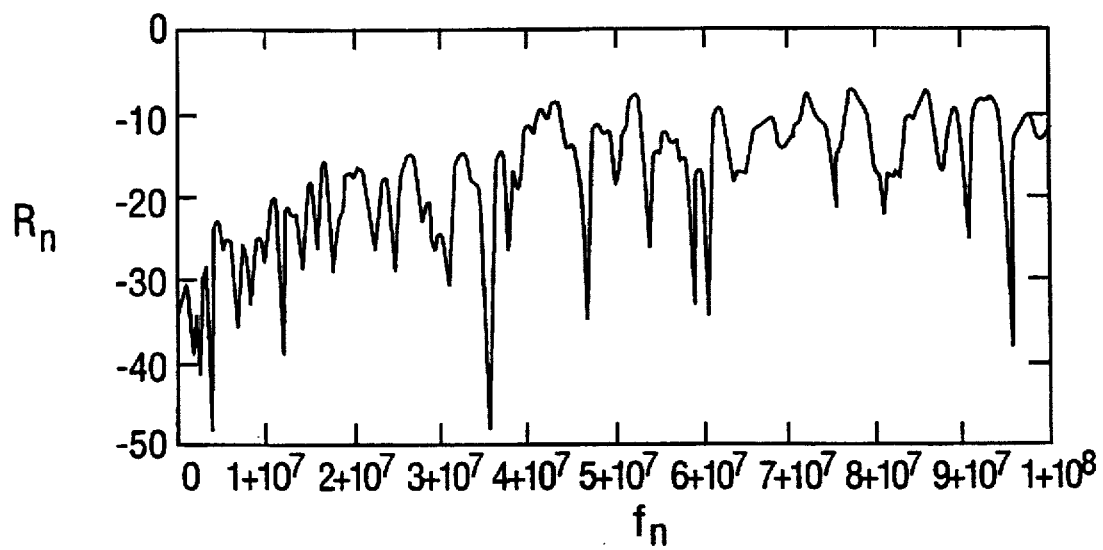
load is terminated with high impedance, open
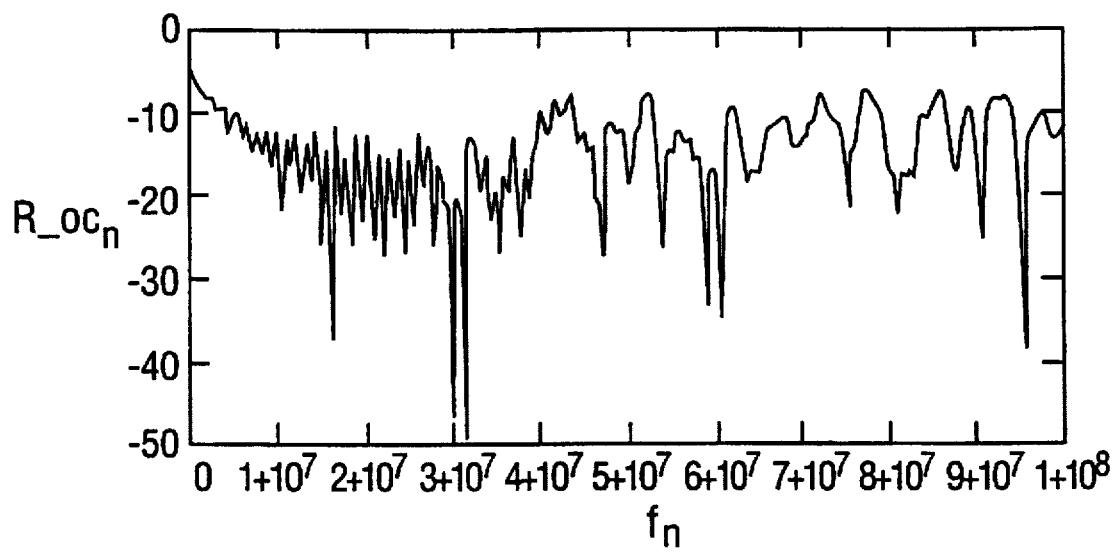
*FIGURE 17* pulse response of cat 5 100M, used the link pulse from 10BaseT
– filter; 20 Mhz cutoff, 5th order butterworth
– time is scaled for 1 bit (100 nsec)

105 at the load pulse response of cat 5 100M, used the link pulse from 10BaseT
- filter; 20 Mhz cutoff, 5th order butterworth
- time is scaled for 1 bit (100 nsec)
open at the load
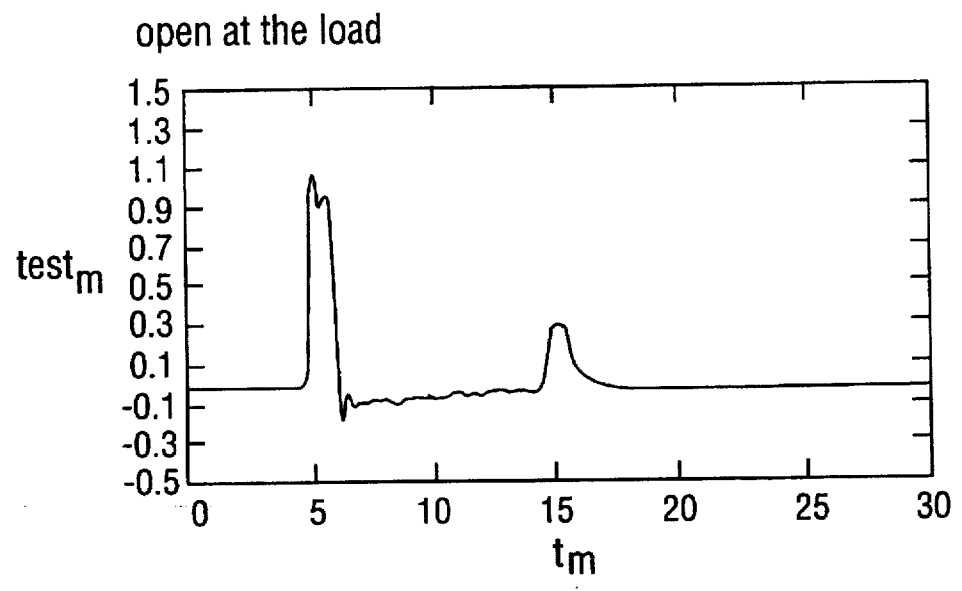
short at the load
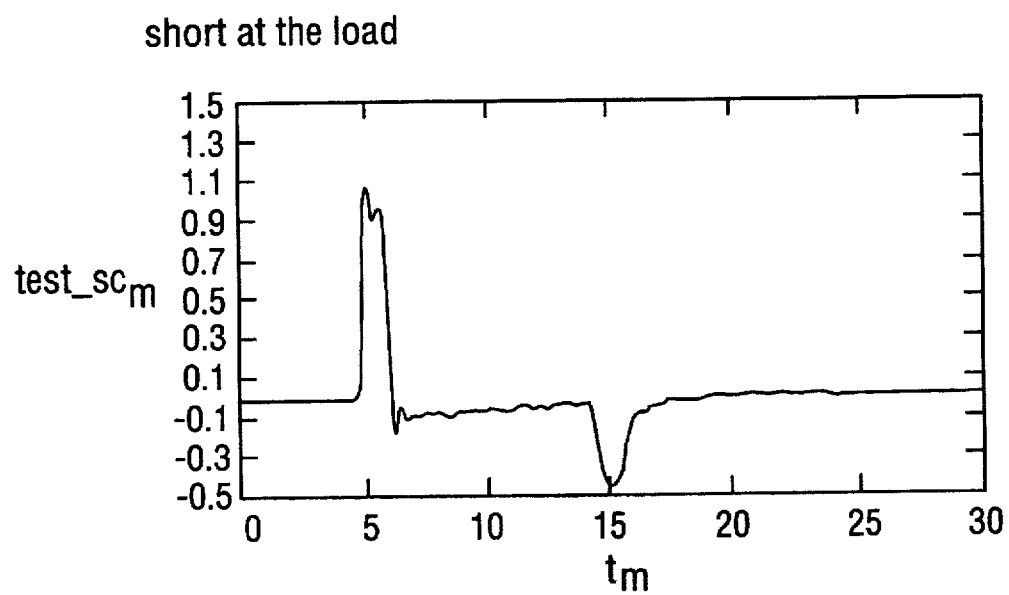
*FIGURE 24* mlt3_psd := p$^{<1>}$    mlt3_bit := p$^{<0>}$
ml := 0.. 1000    MLT3_psd$_{ml}$ := 20 log (|mlt3_psd$_{ml}$|)
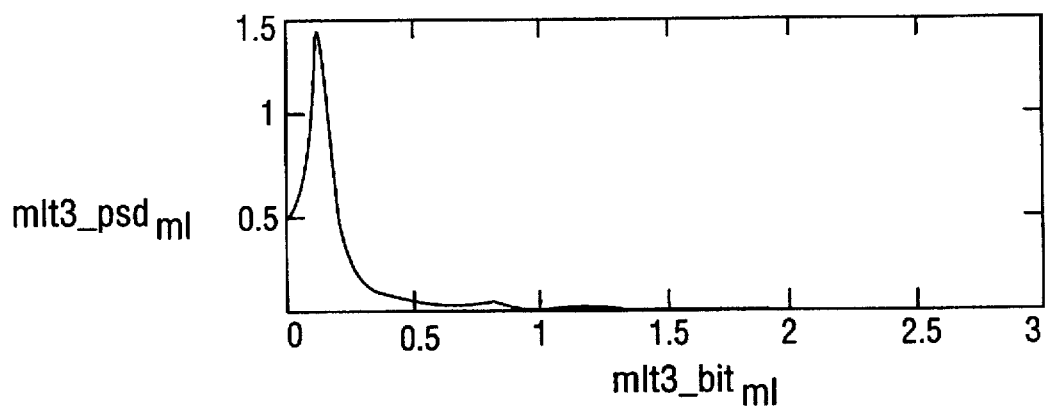
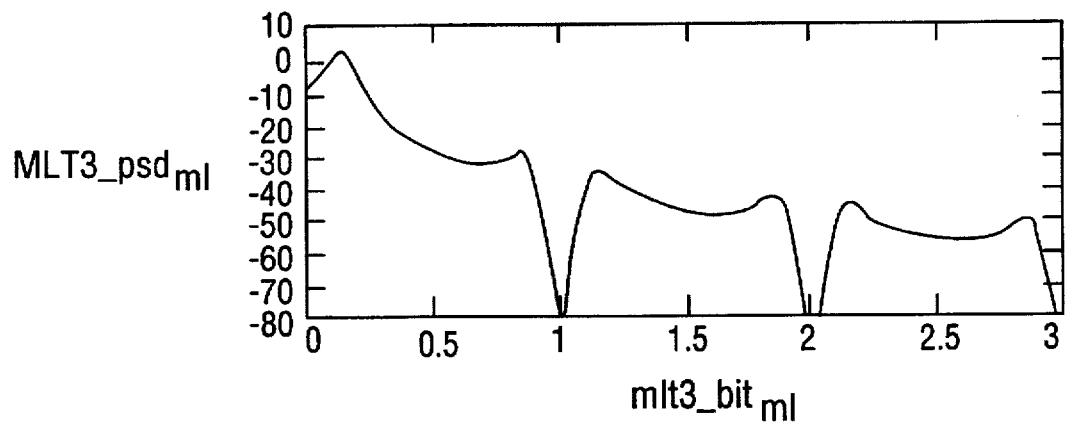
FIGURE 25

METHOD AND DEVICE FOR DETERMINING LINK STATUS IN A COMPUTER NETWORK

FIELD OF THE INVENTION

The present invention relates in general to computer networks, and in particular to computer networks having a network protocol that requires testing or determining the status of links between the computers.

BACKGROUND OF THE INVENTION

Many computer network protocols today have features where the link between one of the stations or computers, to another computer or network component such as a hub ridge or router, is periodically tested to determine if there is a failure on the link.

One way to determine if a link has failed, is to send out a transmission over a transmit line, and wait to get a response over a receive line. If no answer is received, the sending station will conclude that either the transmit or receive line is defective. Various different signalling schemes have been proposed in order to determine whether the transmit line or the receive line has failed and how to convey this information to the proper station in as short a time as possible.

The Institute of Electrical and Electronics Engineers (IEEE) has created a Computer Network Protocol Standard 802. This standard indicates how often signals are to be sent out, and what signals are sent out depending on the condition of the lines. Various modifications are allowed in this standard and applicant has proposed such modifications in U.S. patent application 07/680,098 filed Apr. 3, 1991 which is hereby incorporated by reference. All of these methods and devices for determining link status, rely on the fact that a suitable response is not received to a previous transmission.

Before a station can conclude that there is a link failure, that station must wait for a sufficient amount of time for a suitable response. This is to insure that the lack of a proper response is actually due to a link failure, and not due to the receiving station being otherwise occupied. The International Standard Organization's (ISO) model sets forth waiting periods or time out periods. If a proper response is not received by the end of the time out period, the transmitting station can conclude that there has been a link failure. The time out is a safeguard to insure that a higher layer session (or connection) between two devices is valid and not erroneously indicated as defective. If a connection breaks, at least one of the devices will know that the session is no longer valid. Eventually the end user will be notified of the break and may require some type of intervention. The connection break can be sensed in different ISO layers, however the bulk of the effort has been focused at the physical layer, in the UTP (Unshielded Twisted Pair) or the connector assembly. In a NOS (Network Operating System) such as Novell's Netware™ a transmission of a frame must be acknowledged by the receiving device. If the transmitting device does not receive this acknowledgement by some predetermine time, it will resend the frame and after a predetermined retry count, the session will time out. Other NOS's have similar safeguards and provide slightly different implementations. Each has user selectable parameters, such as timer limits and number of retries. Roughly speaking, the time outs are, using defaults limits in published literature, in the 5 to 20 second range, 500 msec time out for each retry and 20 retries. Furthermore, some NOS's periodically send "hello messages" and require a response. There seems to be endless possibilities to provided this safeguard, each with user selectable parameters to optimize the network performance for their particular need. In each, once a time out occurs the NOS will have to reestablish the connection at this (ISO) layer. In general, this a rather lengthy process and might require user intervention.

N-way is an optional function described in the draft standard 802.3 u (100 Mbit Ethernet). It is an out of band signaling method that a provides a means for two devices to auto-negotiate any common ability for communication. If the devices have the ability to communicate via the methods described in 802.3 u or 802.3 type 10Base-T (10 Mbit Ethernet) the signaling will auto-negotiate such that they find a common communication method. This signaling is performed during a power up (re-initialization) or embedded between frames. For the cat 5 transmission scheme, N-way signaling is performed before any inband information is sent, such as during a power up. The signaling does not come from a higher layer, from the MAC (Media Access Control), thus the signaling is called an out of band signal. For a nonsymmetrical break on the wire, N-way provides a remote fault signal to be transmitted if a receiver does not see proper signals from its communication partner. FIG. 1 shows an asymmetrical break, A does not directly have a way to know if its transmit path to B is valid. Since B does not see any signaling in its receiver, B will transmit a remote fault signal to A. Thus A will know that its transmit path is broken. If both devices have this remote fault function (sensing and indication) then all non-symmetrical breaks can be detected.

Time out is again the issue. N-way must wait for timeouts to expire to indicate a break and to evoke the proper bit to indicate the remote fault signal. According to the 802.3 u, the total time needed to expire is 1.7 to 2.5 sec. After such indication, the end devices must have a means to switch over in a timely fashion if a redundant link is available. N-way is approaching the magnitudes of a higher layer time out, and this would require relatively fast action by a microprocessor. If a slow microprocessor is used, performance can be degraded since any correction of the fault, such as switching over to a redundant line, can be one of many tasks. Another issue is that the remote fault sensing is an optional function (refer to 802.3 u). It is not known if all connecting devices complying to 802.3 will have this feature. Indication of a remote fault feature will work if both end devices have this feature. If only one end device has this feature, complete fault coverage of asymmetrical breaks is not obtained.

The length and number of time outs that must occur before a link is sensed as being defective, and/or before a link can be re-established as being satisfactory, is a source for delays in communications between stations. Very often certain components on network will have redundant links between themselves and the network. This way if one link were to fail, the redundant link could be used and communication could continue. These redundant links are often used in bridge components which connect two LAN's (Local Area Networks). For a share medium, placing address fields in the frame provides a mechanism for devices to know the source of each frame. Furthermore, this layer 2 interconnection (or MAC bridges) can be placed to segment a LAN for better throughput or efficiency. In FIG. 2, a two port MAC bridge is placed between two LAN's (LAN A and LAN B) and provides segmentation of the two LAN's. The bridge will forward frames destined for the specific LAN based on the address field of each frame and prevents frames from going into a LAN segment that it is not destined for.

The bridge is essentially filtering frames, thus prevented unnecessary frames from LAN A going into LAN B, the same is true in the other direction.

An extension of this idea is to allow multi port bridges as shown in FIG. 3. A multi port bridge can segment a LAN into smaller segments or allow redundant connection in each segment. The issue with this approach is that frame replication can occur when redundant links are kept open. Therefore the redundant links must be closed.

A spanning tree algorithm was developed to resolve this by "pruning" any redundant connection (or getting rid of any loops in this layer). The Spanning Tree Algorithm (STA) is a method for interconnecting MAC devices (part of layer 2). ISO defines this as the Dated Link Layer, or the medium access method (MAC), it must follow specific protocols;

1) Transmission and reception of data in a shared medium (bus or ring topology)
2) the formatting of data and definition of the fields in each frame
3) each MAC has a unique hardware address At this layer, data is formatted to the following, 1) start delimiter
2) source and destination address
3) data with error checking
4) end delimiter.

The spanning tree algorithm breaks any redundant connection at layer 2 but does not break the connection at the wiring. In order to achieve this, each MAC bridge must send a "Bridge Protocol Data Unit" (BPDU) to advertise port ID and bridge ID, these are bridge specific parameters. The STA selects a root bridge and the "root" port of each bridge based from the information advertized from each bridge. The root port in each bridge will transmit and receive data, while the non root ports will not pass any data (data in this case is consider layer 2 frames and higher). After the STA has converged (when it eliminates all loops), the root bridge sends a configuration message at 1 to 10 second intervals, to sense the configuration of the network. If a connection is broken between two LAN segments, the STA will ensure that the root port of a bridge will time out and will eventually send a "topology change notification" BPDU. When the root bridge is notified of this change, it will invoke actions to remedy this. For example, if two multi port bridges were connected between two LANs the STA will select a root port from each bridge, if this root port connection was broken, then the STA will select a new root port in each bridge thus providing the redundancy. The problem with this is the time out at higher layers (where the NOS comes into play). The configuration messages come every 1 to 10 seconds and more time is needed for the root ports in STA to time out and then to evoke the proper action. For large networks, reconfiguration can be a lengthy time process.

Therefore if a primary link was to fail, a station or bridge would only know about it after the required time outs have expired. Then in order to switch to the redundant link, additional signals must be sent over the redundant link in order to verify that it is operational. These verifying signals, are also subject to time out conditions.

SUMMARY AND OBJECTS OF THE INVENTION

It is an object of the present invention to determine computer network link failure without having to transmit a test signal and wait for a time out period in order to determine the status of the link.

The present invention accomplishes this object by measuring at a transmitting, or first, end of a link, a signal reflected from a receiving, or second, end of the link. Data to be communicated over the link and through the computer network is a multi-level signal where each level corresponds to a bit of data. Thus the bit rate of data on the network determines the level changes, and the frequency content of the signal. The data to be transmitted is converted or scrambled in such a way to approximate a random (pseudo random) sequence of information. For coherency, the receiver must reconvert or descramble the signal. The conversion or scrambling reduces spectral lines in the frequency domain and distributes the spectral power over a wider range. Such techniques are also useful for timing recovery and adaptive filtering techniques. This scrambling or conversion is also important with respect to radiation, since it leads to lowering the magnitude at the radiated path. Such random or pseudo random processes have a known spectrum.

If two paths of a transmission line are spaced far apart, and the frequency of a signal on the paths is very small or at a dc value, there is very little electromagnetic field interaction between the two paths. However when the lines are spaced close to each other, and the frequency is increased, capacitive and inductive effects are formed between the paths. Then the path begins to act like one plate of a capacitor with the other path acting as the other plate of the capacitor. Also both paths have varying magnetic fields which interact with each other and cause each path to act as an inductor. In general a transmission line has two important features namely Zo, the characteristic impedance, and L, the length of the line.

The line can be further represented by "black box" analysis. For the simple case of a two port linear time invariant system, voltage and currents are applied in one port while a measured value is obtained at the other side of the system. The input to output relation then characterizes the system. These relationships can be placed in matrix form so that its inherent structure can be used for further analysis.

The ABCD matrix is defined as $$V1 = A*V2 - B*I2 \rightarrow \begin{bmatrix} V1 \\ I1 \end{bmatrix} = \begin{bmatrix} A & B \\ C & D \end{bmatrix} \begin{bmatrix} V2 \\ I2 \end{bmatrix}$$
$$I1 = C*V2 - D*I2$$

For a general line, its ABCD matrix representation is $$\begin{bmatrix} V1(f) \\ I1(f) \end{bmatrix} = \begin{bmatrix} \cosh(a(f)*L) & Zo\sinh(a(f)*L) \\ \sinh(a(f)*L)/Zo & \cosh(a(f)*L) \end{bmatrix} \begin{bmatrix} V2(f) \\ I2(f) \end{bmatrix}$$

where a(f) is the propagation equation

Category 5 UTP imperfections occur due to non ideal conductors, dielectric and twist. The result of non ideal twist are;

1. Differential to common mode conversion, insufficient cancellation of the differential nature of the signal.
2. Crosstalk, same as above.
3. Characteristic impedance is not uniform.

Published performed experiments have shown Zo variations in short segments (10 feet). Also, the Zo is random. In general one segment cannot predict with some knowledge, the value for an adjacent segment (this implies independence). Some periodicity was seen but this was for long cable distances.

To get a good characterization of the reflection coefficient, one can build a model based from the published experiments. A 100 meter UTP transmission line is segmented into smaller lengths, approximately 1 meter. Using the ABCD matrix, a scaled version can be defined.

$$\begin{bmatrix} \cosh(a(f)*L/1) & Zn*\sinh(a(f)L/1) \\ \sinh(a(f)*L/1)/Zn & \cosh(a(f)*L/1) \end{bmatrix}$$

where;

L is the total length of the line
1 is the length of each segment
Zn is a randomly generated value of that particular segment Usage of the ABCD matrix results in a cascaded structure which is simply matrix multiplication

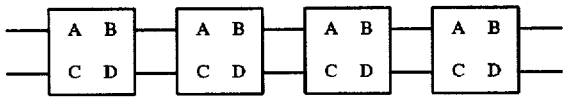

So the cascaded structure yields a composite UTP model which represents the non uniform Zo due to non ideal twisting. This assumes the segments are sufficiently small so that it closely approximates to a distributed system.

REFLECTION

By definition, the reflection coefficient is $$[Z1(f)-Zo(f)]/[Z1(f)+Zo(f)]$$

while the return loss is $$20*\log|[Z1(f)-Zo(f)]/[Z1(f)+Zo(f)|\ ]$$

Intuitively, both equations represent the amount of signal not absorbed by the load (Z1) and thus reflected back to the source. In our composite model, let Zc be the characteristic impedance of the cascade structure. Therefore, the reflected signal is $$[Z1(f)-Zc(f)/Z1(f)+Zc(f)]$$

and Zc can be found from the ABCD matrix by using the fact Zc=V1/I1.

$$Zc=(A*Z1+B)/(C*Z1+D)$$

note the freq dependency has been dropped

A detector can be made to discriminate between a transmitted signal versus its reflected signal. This implies a detector which can sense signal direction. Consider the circuit shown in FIG. 7.

At the point Vx, it will not detect signals from the tx driver while it will see the reflected signals. A similar circuit has been used for echo cancellation, but for our application we want to detect the signals reflected back due to mismatches.

As defined in TP-PMD standard (X3T12 spec), a scrambler will be used prior to three level encoding. The power spectral density (PSD) can be calculated by considering the finite state machine shown in FIG. 11.

Using stochastic process;

$$S(f) = \int_{-inf}^{inf} R(t)*\exp(-j*w*t)dt\ w = 2*pi*f$$

$$R(t) = \int_{-inf}^{inf} S(f)*\exp(j*w*t)df$$

since $$R(t) = \lim_{T \to inf} 1/(2*T) \int_{-T}^{T} x(p)*x(p-t)\,dp$$

so, $$R(0) = E\{\hat{x}2(t)\} = \int_{-inf}^{inf} S(f)\,df$$

the output response of a linear system is; Sy(f)=Sx(f)|H(f)|^2

Analysis of scrambled MLT3 coding shows that it has low frequency content, see the attached simulation results in FIGS. 12–25. In the case of an open or a short, the detector will sense a large amount of the low frequency signals due to the reflection coefficient and the low frequency content of the code. For the terminated case, the low frequency content of the code is attenuated by the reflection coefficient, thus the reflected signals are very small. So the mean square value of the system is;

$$Ry(o) = \int_{-inf}^{inf} Sx(f)|H(f)|2\,df$$

where;

Sx(f) is the PSD of the scrambled MLT3 code
H(f) is the cascade of the UTP reflection, direction sensing and a low pass filter Graphically, this is represented in FIG. 26

FIGS. 12–25 are results of the frequency domain and the time domain behavior of CAT 5 UTP as measured in the lab and from simulation using the ABCD matrix method. Examination of the results shows the following;

1. Terminated case: At low frequency very little signal is reflected back.
2. Open and short case: The low frequency content has increased, thus a large amount of signal will be reflected back.
3. All cases: As frequency increases, reflected signal increases. A low pass filter is needed to eliminate the high frequency component to ensure proper fault detection.
4. The time domain shows consistent behavior. Note that the model is pessimistic in the signal loss.

Further simulations shows that a 20 dB margin can be achieved by sensing the rms value of the signal when it is properly terminated versus the fault condition (open or a short). Also note that lab and simulation was performed with 100 meter line length. At shorter distances, more signal is reflected back (due to lower insertion loss). The 100 meter simulations represents a group of worst case scenarios.

The IEEE standard 802.3 u describes a transmission method to communicate 100 Mbit of information between end devices, the media access method is CSMA/CD (Collision Sense Multiple Access/Collision Detection) while the actual transmission method is described in TP-PMD X3T12.

The link between computers, contains a transmit line and a receive line. Each of these lines can be considered a transmission line in electromagnetic field theory. Such transmission lines are known to have characteristic imperfections which hinders the propagation of a signal. A transmitter transmitting a signal onto such a transmission line will configure the signal for the characteristic impedance and imperfections. In order for optimum transmission of the signal, the load at the end of the transmission line, or the second end of the link, should have the same impedance as the transmission line or link. If the load does not have the same impedance as the link, not all of the signal will pass through the load, and a portion of the signal will be reflected back to the transmitter in a direction opposite to the direction that the signal was initially transmitted.

Generally when a link fails, the impedance of the load changes. Often failures are due to the line being open or short circuited. Such a condition causes a much different impedance at the end or termination of the line, and there is a significant reflected signal transmitted back to the transmitting end. By measuring the reflected signal, the status of the line as being satisfactory or defective can be determined. Since the signal is substantially continuous, random and of a known spectrum, a failure in the link will show up instantaneously, and the transmitting station will immediately know that there has been a link failure. By a known spectrum, Applicant is describing a spectrum which appears random or is pseudo-random, but the statistics or probabilities are known. Therefore, any deviation from the known statistics indicates a fault. The station can then take appropriate action. Correspondingly a redundant link can be quickly tested to determine if it is operational. The need for waiting through time out periods, and successive numbers of retrys, is not needed. Also the measuring of the detected signal, can be performed at a very low hardware level, and therefore higher levels of the operating system do not need to be involved, especially when switching between a primary and a redundant link.

This method is especially suited for IEEE standard 802.3 u due to the large data rate of 100 Mbit, especially the transmission method specifying the usage of category 5UTP. Category 5UTP has inherent known physical characteristics and hardware implementations correct these transmission impairments. Therefore the method and device for transforming the data into a substantially continuous signal with a substantially uniform and known spectrum, along with measuring the reflected signal, is well suited to determine link failure in networks according to IEEE standard 802.3 u. Such methods and devices can operate much faster than those methods using test signals, and they can be implemented into the existing standard while still being compatible with the standard. The method and detection of the present invention can also be used to fulfil the link status requirement of the IEEE 802 standard.

It is further an object of the present invention to provide a method and apparatus for detecting link failure which is simple in design rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIGS. 12 through 25 are results of frequency domain and time domain behavior of category 5 UTP;

DETAILED DESCRIPTION OF THE PREFERRED EMBODIMENT

Figure 1:
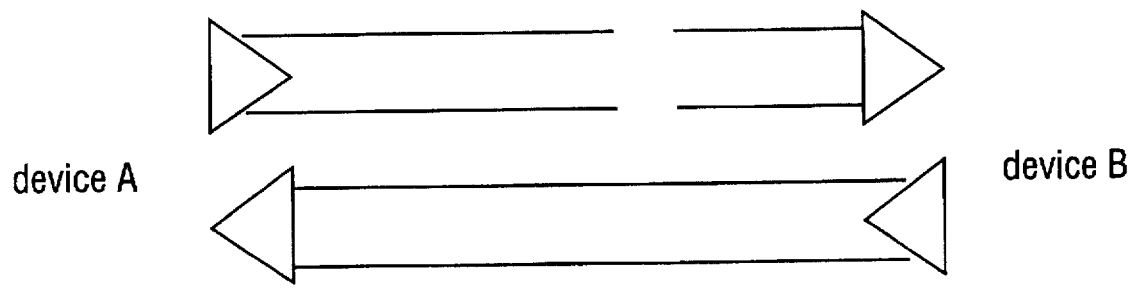
FIG. 1 is a schematic view of a link between device A and device B showing an asymmetrical break.
Figure 2:
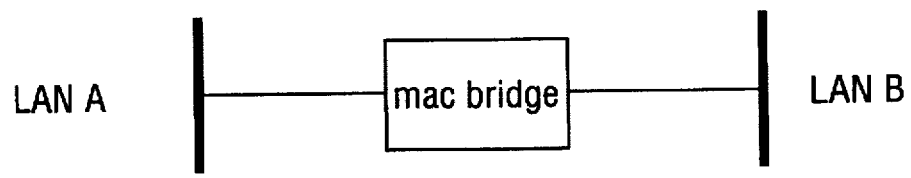
FIG. 2 shows two separate LANs connected by a bridge.
Figure 3:
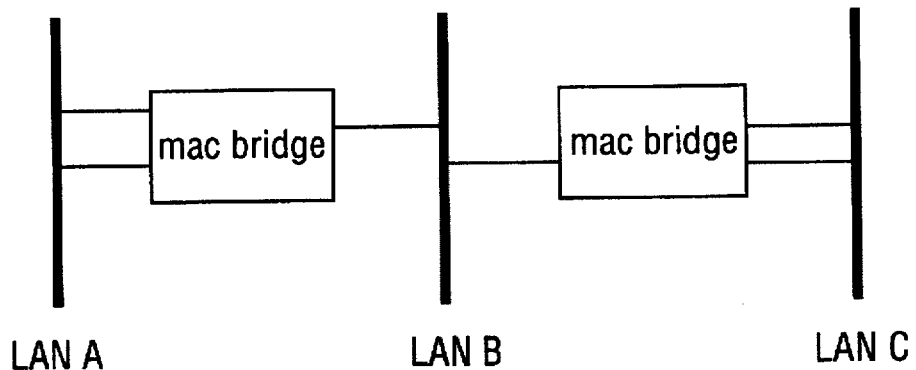
FIG. 3 shows several LANs connected by bridges having redundant links.
Figure 4:
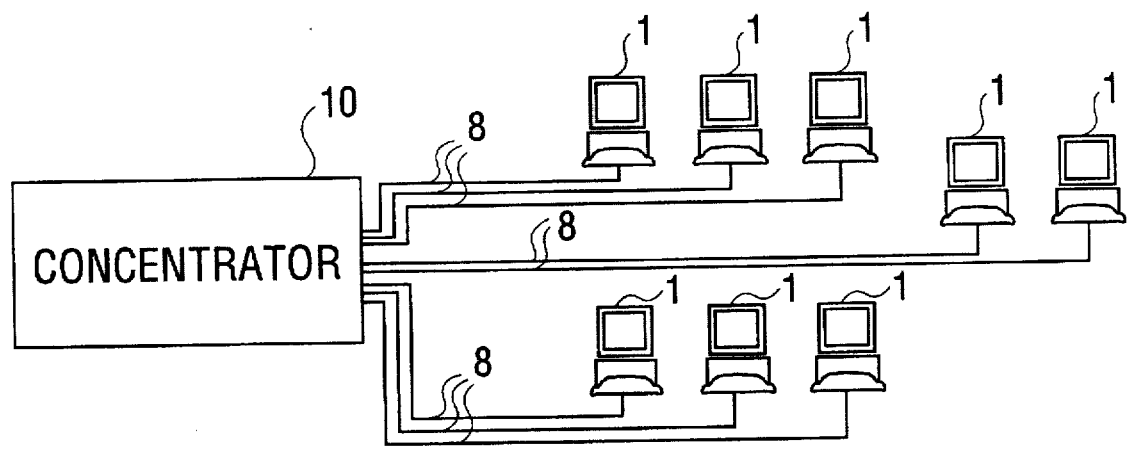
FIG. 4 is a schematic view of work stations connected to a concentrator.
Figure 5:
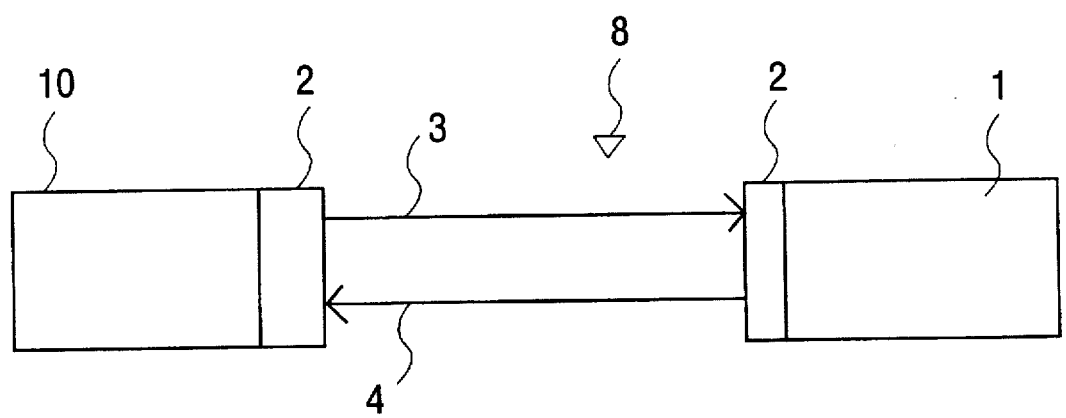
FIG. 5 shows a link between two stations.

Referring to the drawings, and in particular to FIG. 4, the present invention has a plurality of stations each connected to a concentrator 10 by links 8. Most of the network management is performed in the concentrator, with individual workstations communicating between each other through the concentrator 10. As shown in FIG. 5, the concentrator 10 and the stations 1 have a physical layer or network module 2 which takes care of the physical requirements of transmitting over the link 8. The link 8 includes two lines 3 and 4. One of the lines being a transmit line and the other being a receive line depending on the point of view of the station 1 or the concentrator 10. From a point of view of the station 1, line 4 is a transmit line and line 3 is a receive line. Each line is further broken down into electrically conductive paths such as 5 and 6 as shown in FIG. 7, and described further on.

Figure 6:
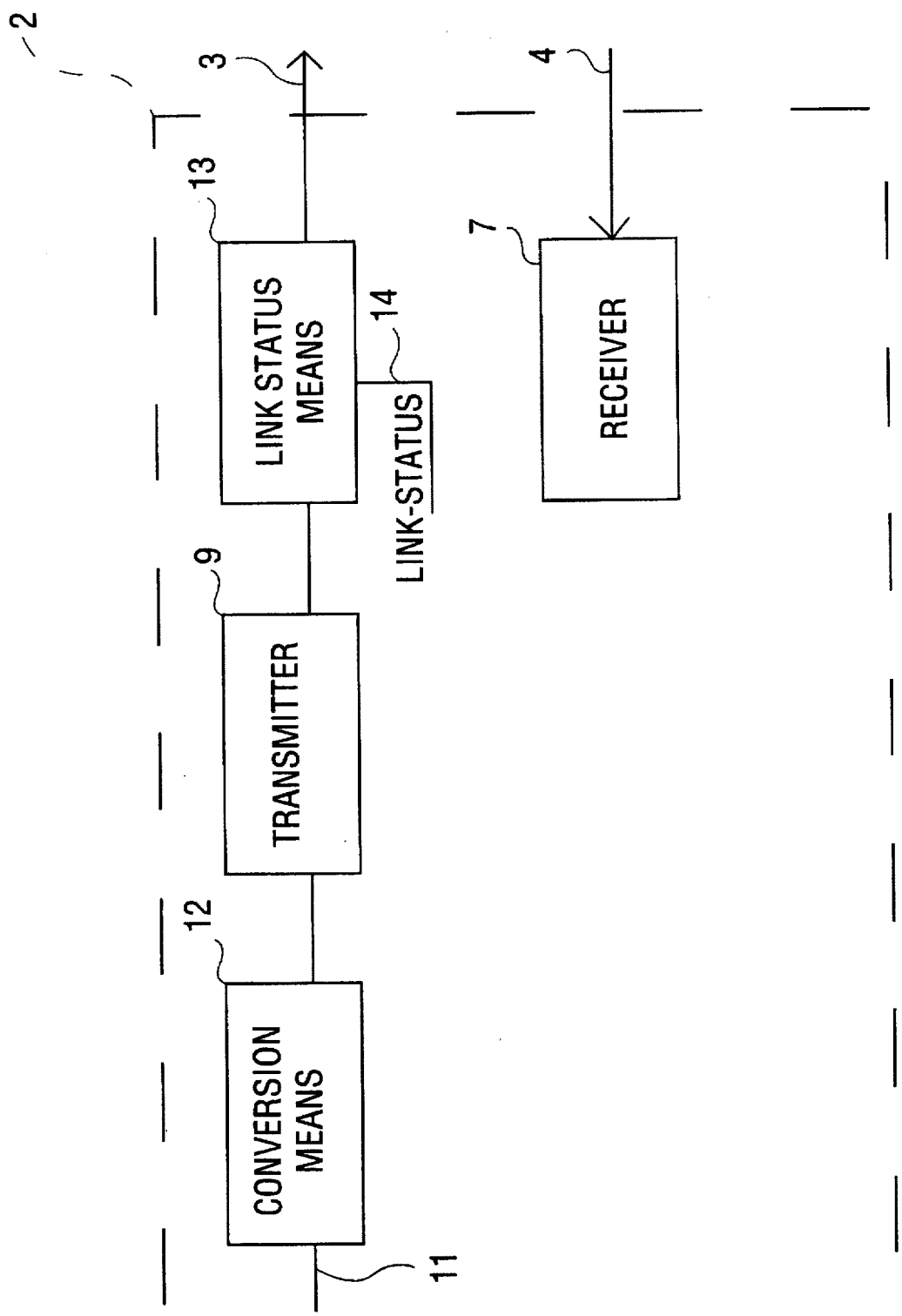
FIG. 6 is a schematic representation of the network module of a station.

Inside the network module 2, as shown in FIG. 6, is a receiver 7 and a transmitter 9. The actual data to be transmitted is received by the network module 2 over a data line 11. A conversion means 12 converts this data into a substantially continuous signal and with a random but known substantially consistent spectrum. From there the signal is received by a transmitter 9 where it is configured to the characteristic impedance and imperfections of the link, and to the load at the receiver. A link status means 13 is positioned in between the transmitter 9 and the transmit line 3. The link status means 13 measures the amount of signal reflected back from the transmission line 3. Ideally if the load is properly matched to the transmission line, there will be no reflected signal. If the reflected signal is greater than an acceptable limit, the link status means 13 indicates that the link is defective, preferably along a link status line 14.

Figure 7:
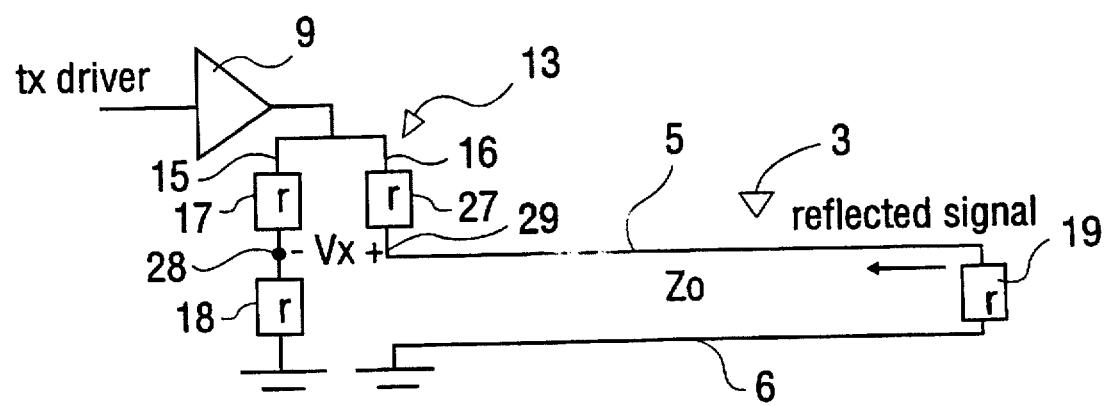
FIG. 7 is a schematic view of the link status means.

The link status means 13 preferably comprises first and second branches 15 and 16, as shown in FIG. 7. The first branch includes first and second sensing loads 17, 18 connected in series, and the second branch includes sensing load 27 in series with the transmission line and load 19. Each of the sensing loads 17, 18, and 27 having an impedance which is substantially equal to that of the load 19. The first path 5 of the transmission line 3 is connected to one end of the sensing load 27 of the second branch 16 and to the load 19. The second path 6 of the transmission line 3 is connected to ground.

A measurement Vx is taken from a point 28 between the first and second sensing loads 17, 18 of the first branch, to the point 29 in between the load 27 and the load 19 of the second branch 16. In this circuit as shown in FIG. 7, the continuous signalling is driven by a voltage source. If the end of the line is shorted or open, all of the reflected signal will go back to the source. If the line is not open or shorted, a very small, if any, amount of signal is reflected back. The link status means 13 or direction sensing circuit, positioned at the transmitting end of the link, will detect these fault conditions. By measuring the difference Vx, the transmitting driver's voltage will cancel out while any reflected signals will be seen coming from the load 19. A similar circuit is used for bi-directional transmission due to its inherent echo cancellation section. However in the present invention the circuit is designed for sensing an echo and thus detecting a fault in the line.

Figure 11:
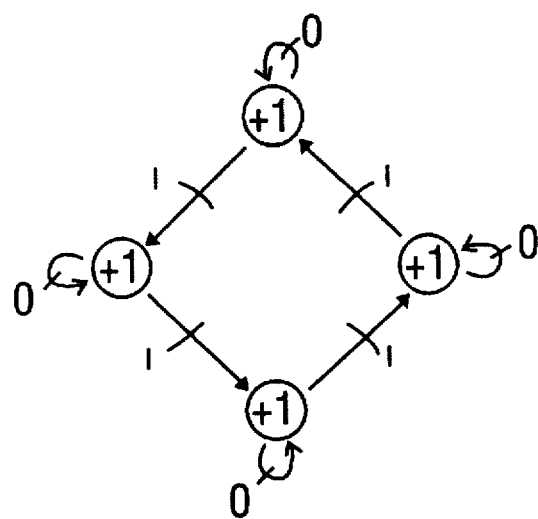
FIG. 11 shows a finite state machine used to calculate the power spectral density.

The standard TP-PMD developed by X3T12 (standards body) describes a mechanism for scrambling data. Using FIG. 6, the scrambling is in the conversion means 12. To comply to the TP-PMD, the signals must be continuous and scrambled. This signal then goes to the finite state machine shown in FIG. 11 which performs a two-level to three-level encoding. Given the above conditions—continuous, scrambling and encoded signalling—the new signal going into the transmitter (9 in FIG. 6) can be considered a stochastic process. The scrambler causes the signal into 9 to be non-deterministic (or known in a probable sense). And having a descrambler reconvert the signal at the receiver will make the signal deterministic. Since the link status means does not have this descrambler, the signals at this point are still considered stochastic (known in the probable sense). Statistical-based information can be obtained, such as the power spectral density (PSD or the spectrum). The technique used to calculate the power spectral density is not shown since it is known, and there are several techniques to calculate this. Thus a person skilled in this subject matter can calculate the PSD, but knowledge of state machine as shown in FIG. 11 is needed. The result and knowledge of the PSD mean is useful. By inspecting the PSD, one can see the frequency content of the code and the mean square value (or rms value) of the code or as it passes through a known system.

Figure 26:
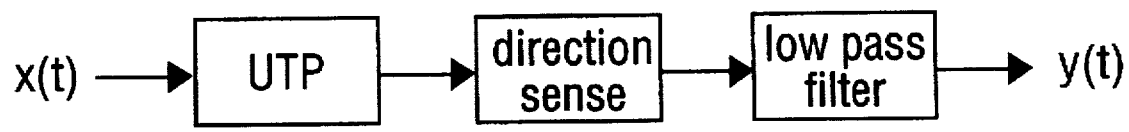
FIG. 26 is a graphic representation of the transfer function of the link.
Figure 12:
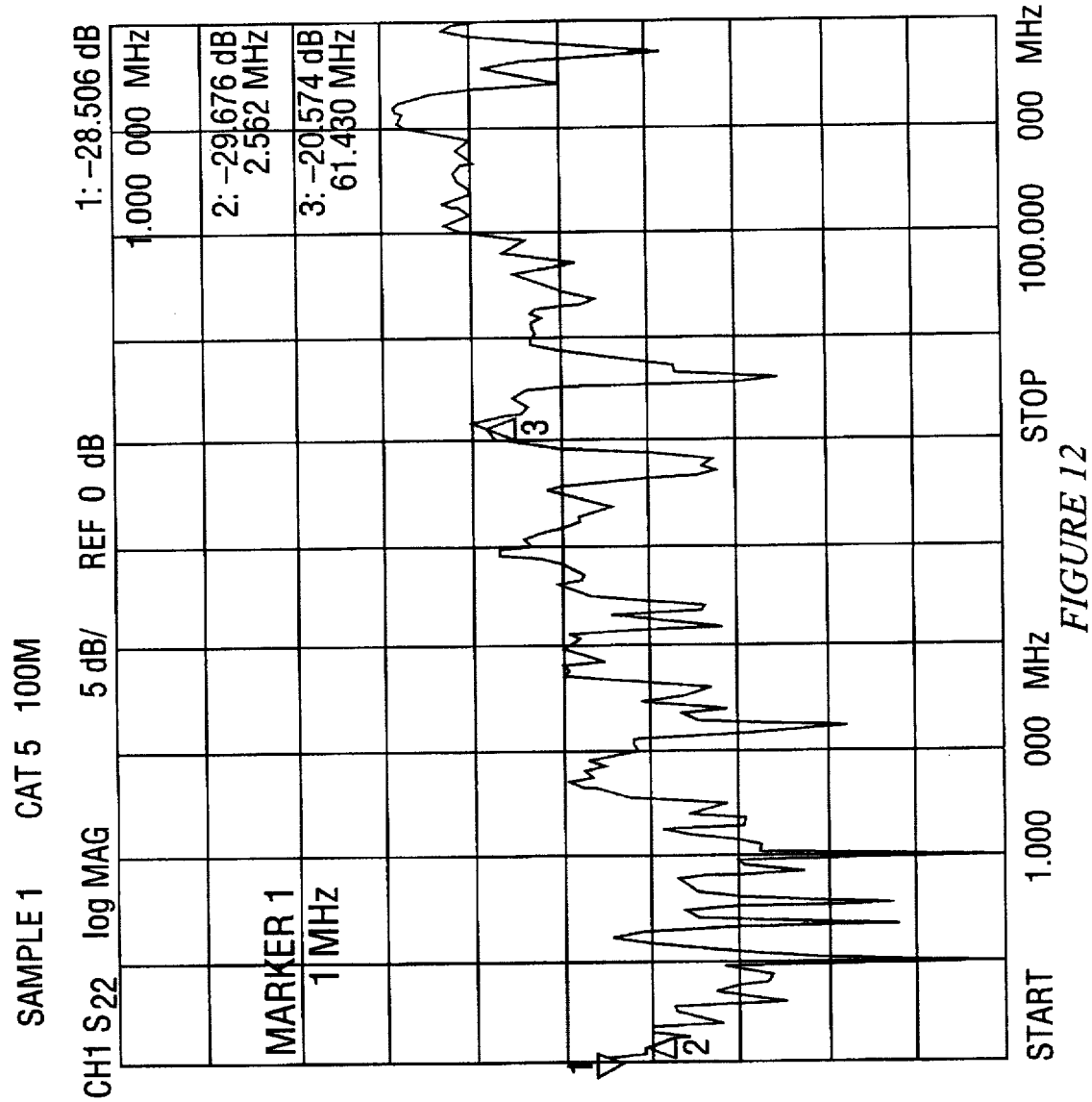
Figure 13:
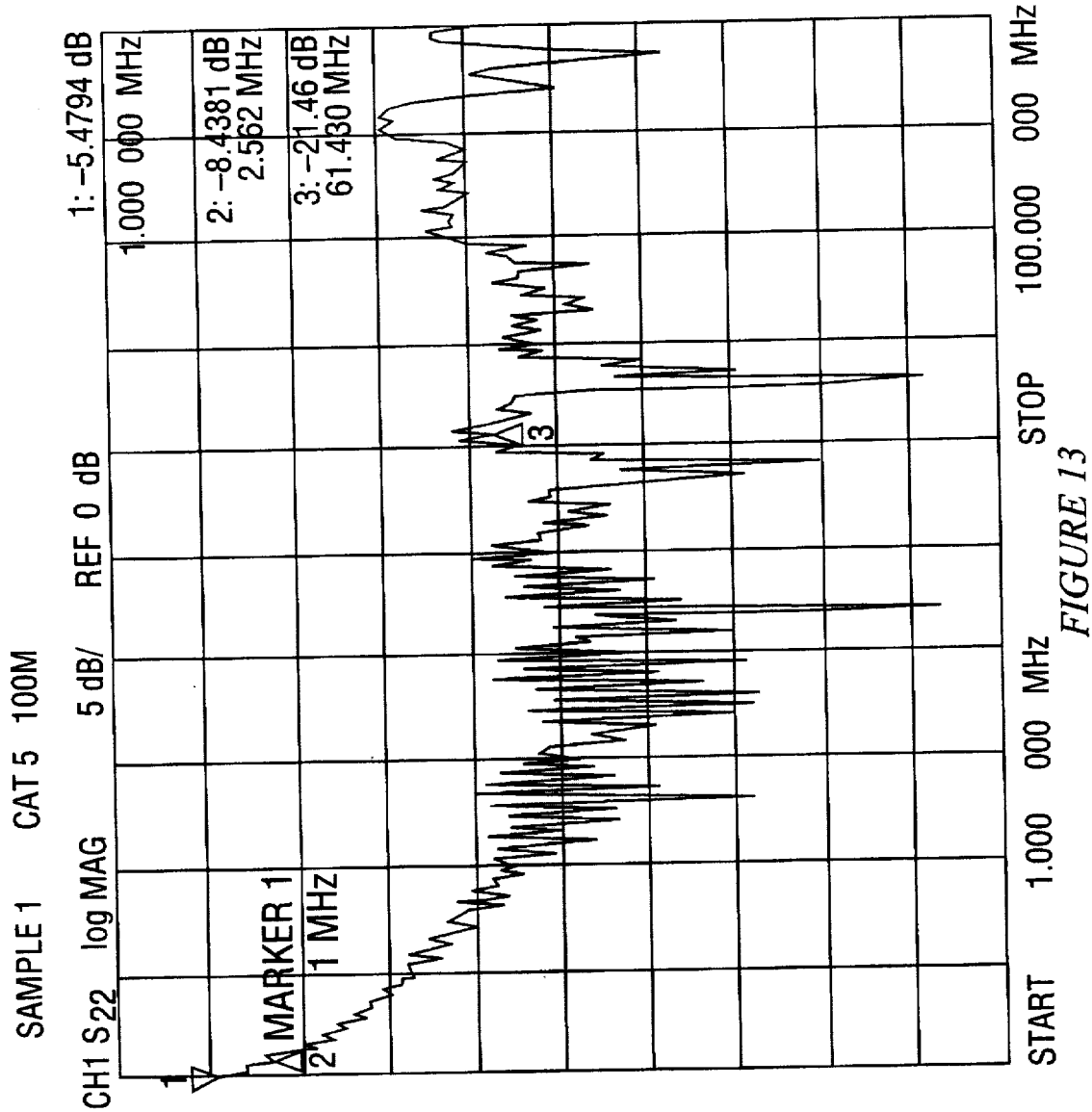
Figure 14:
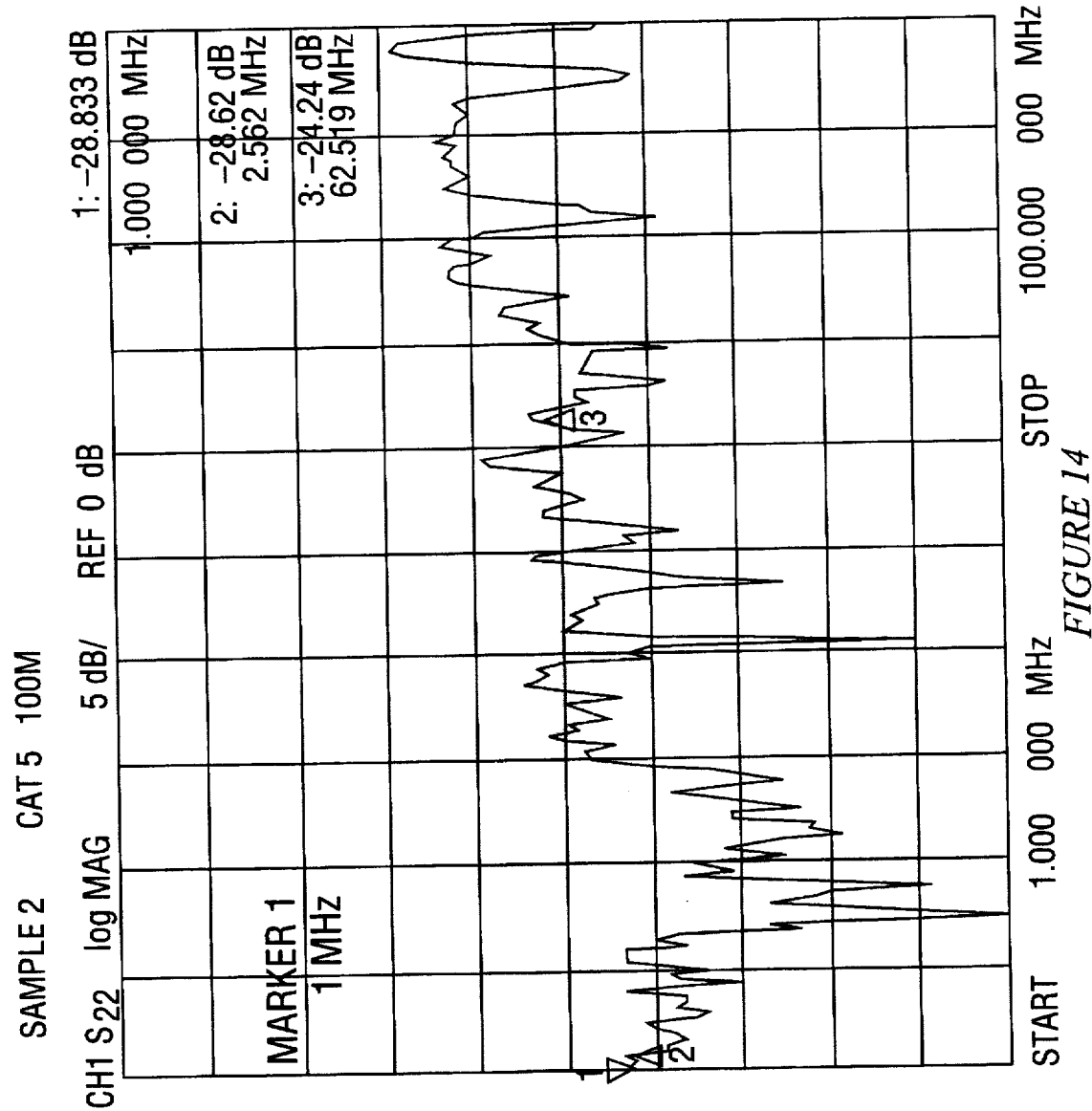
Figure 15:
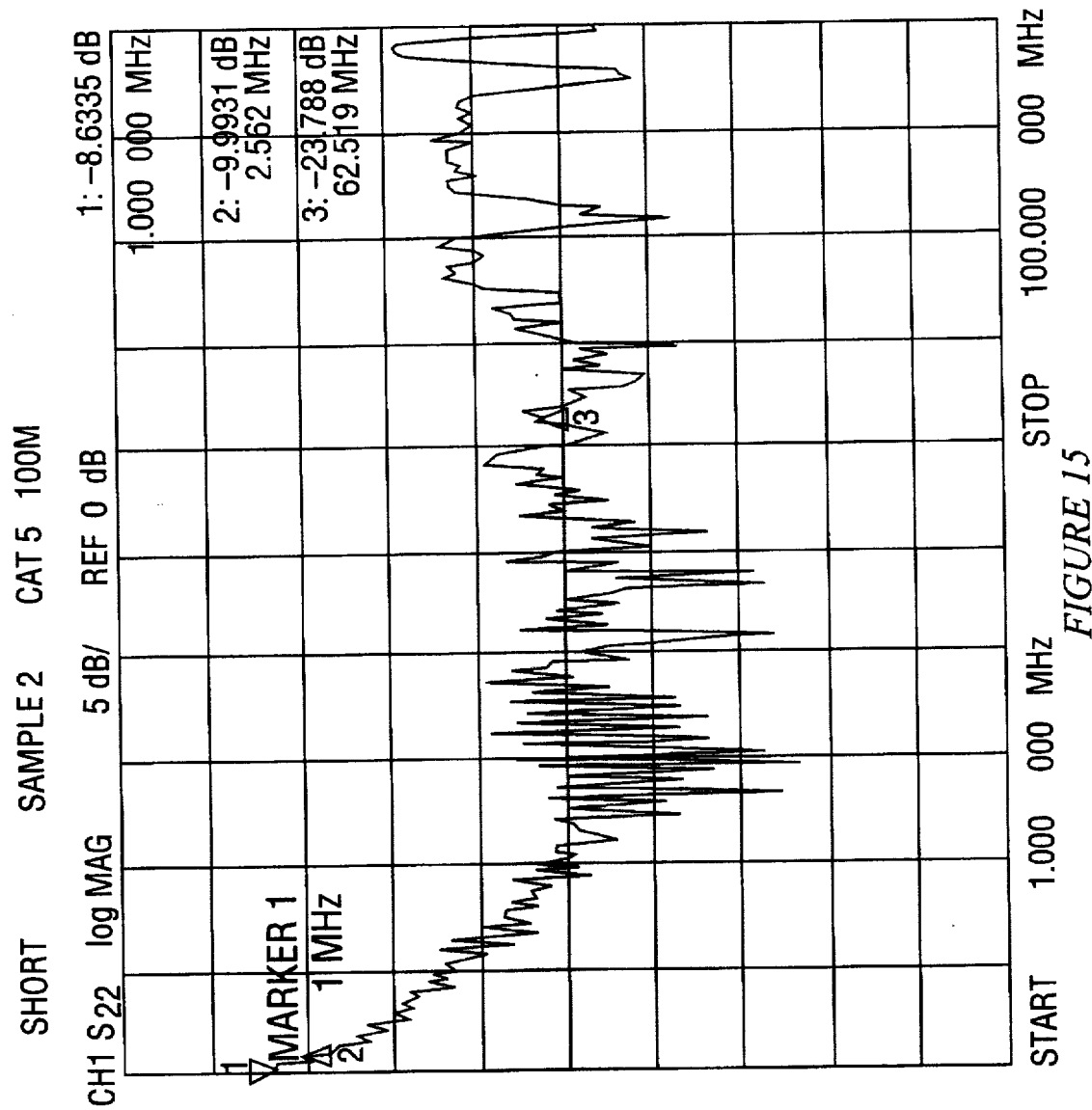
Figure 16:
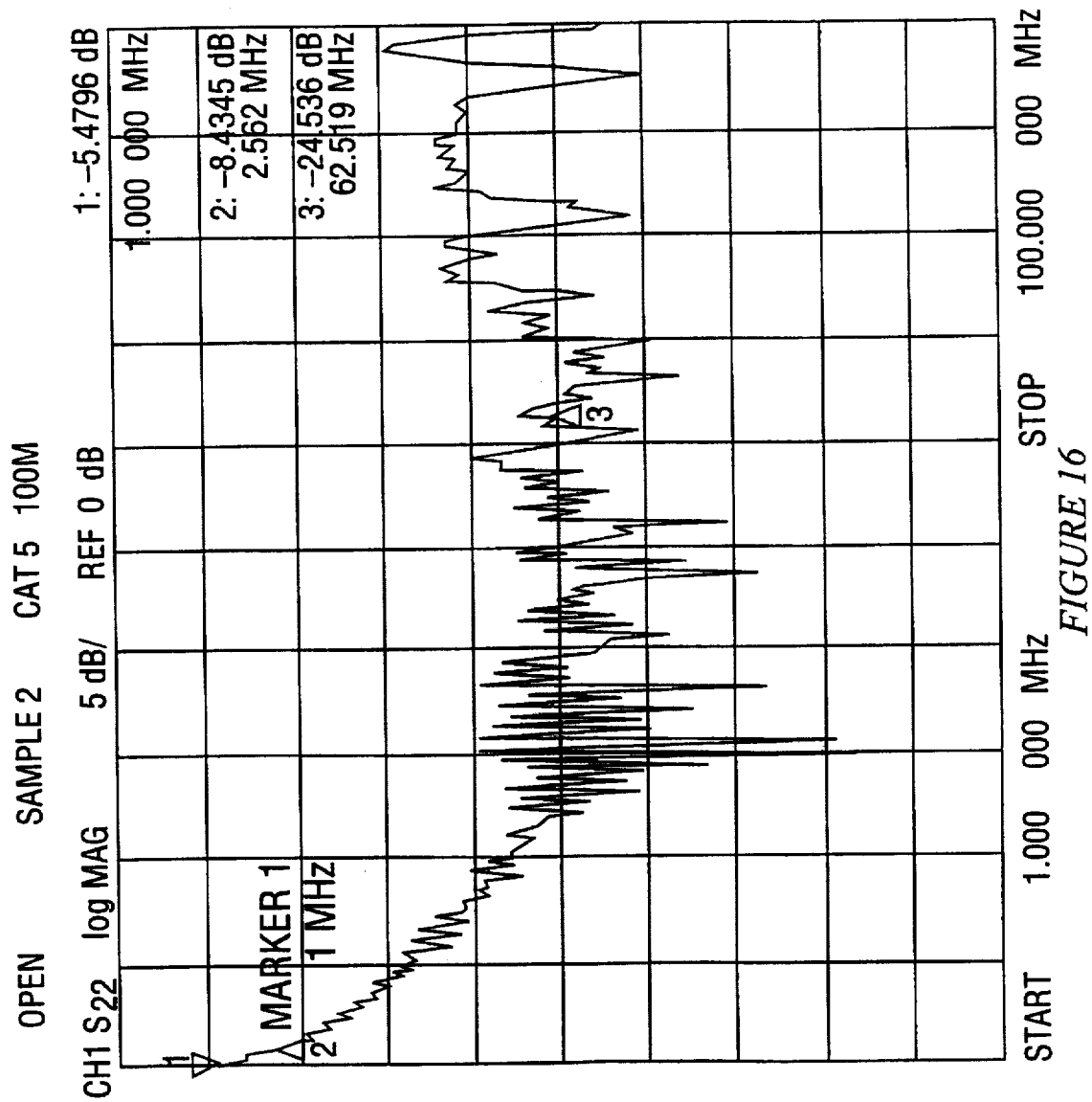
Figure 18:
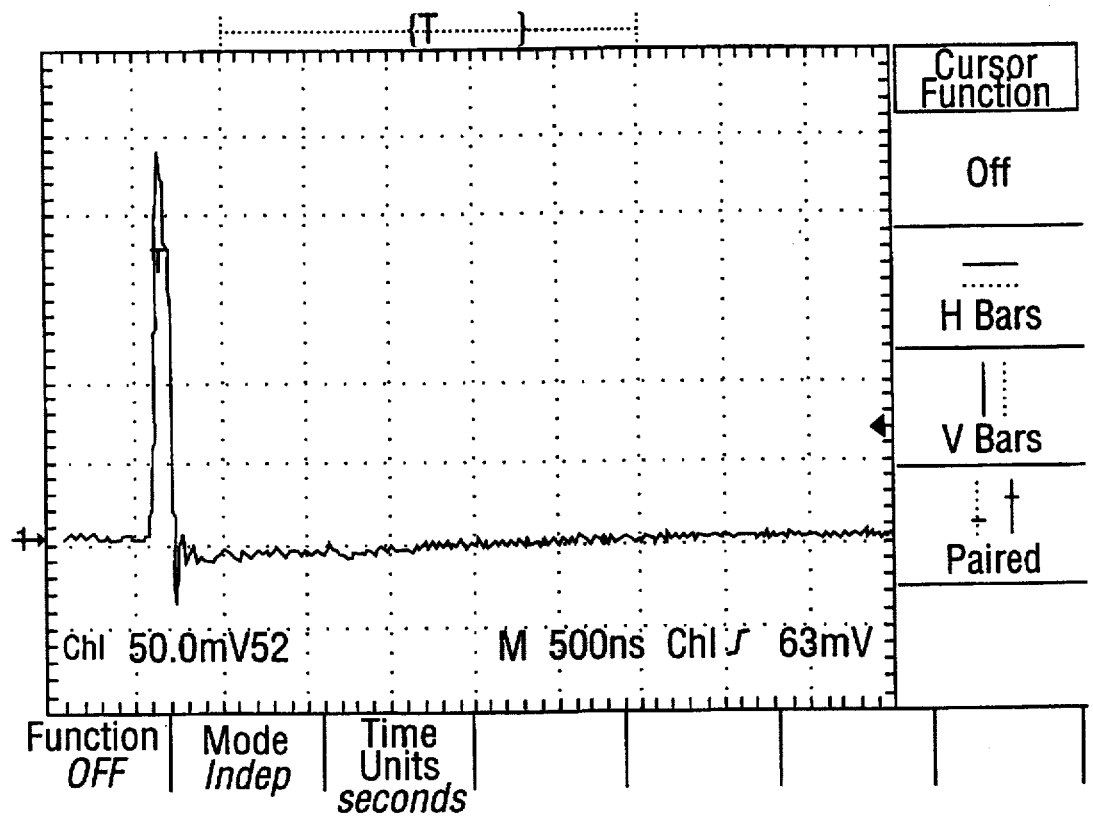
Figure 19:
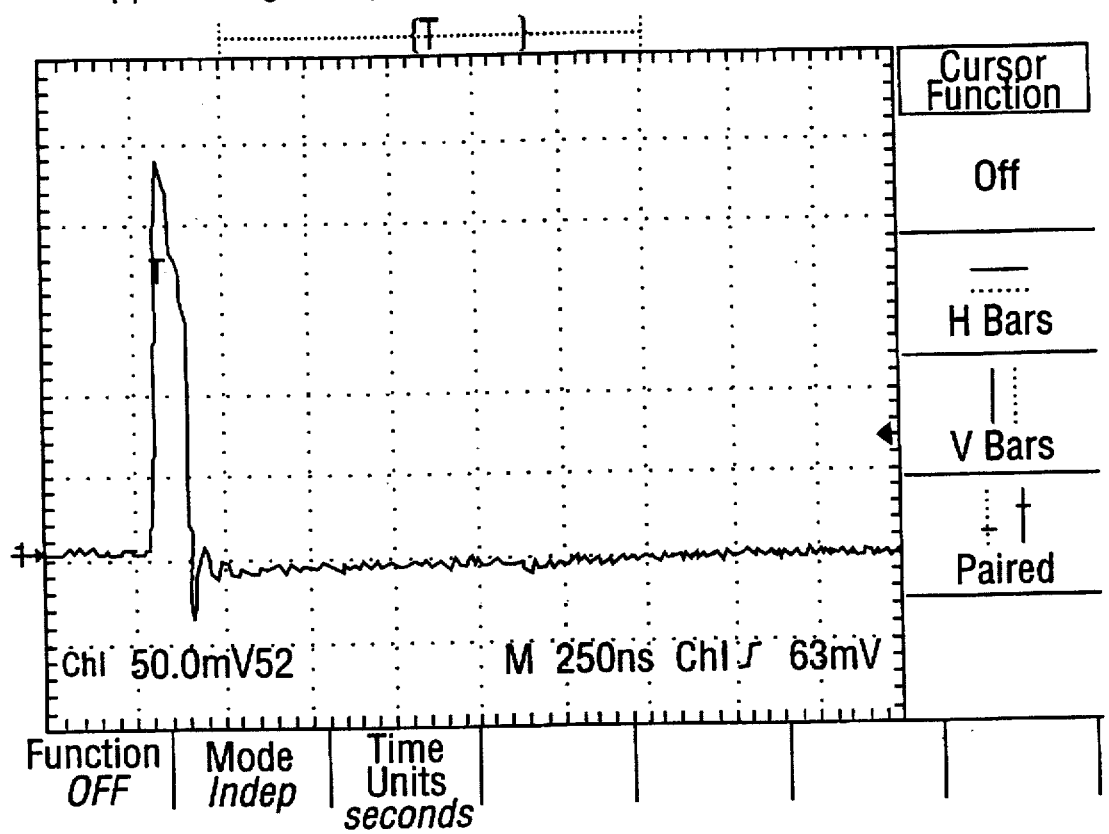
Figure 20:
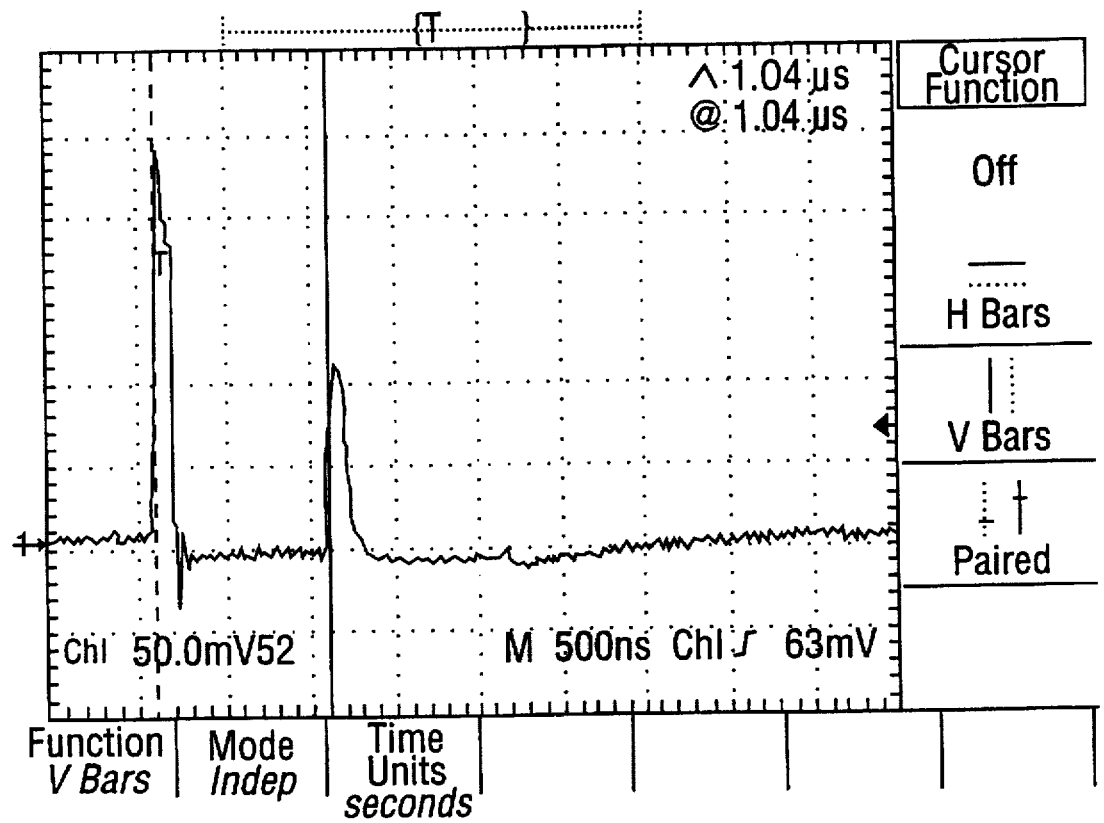
Figure 21:
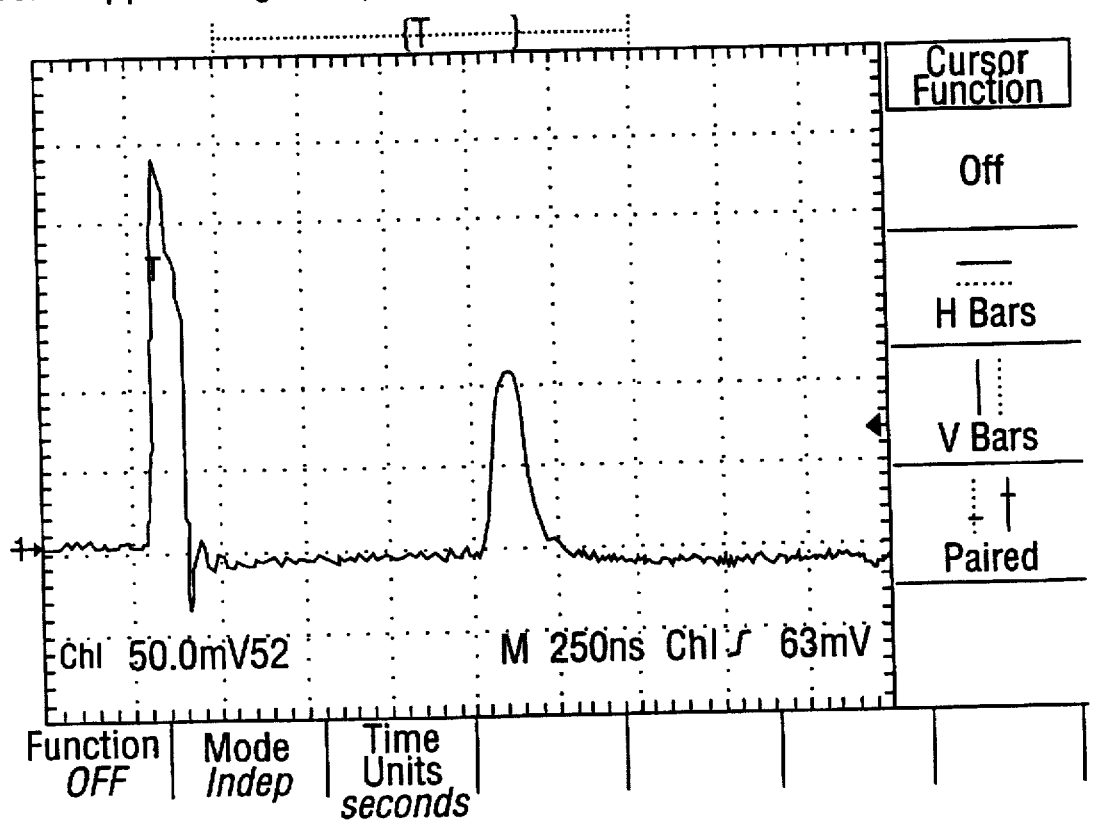
Figure 22:
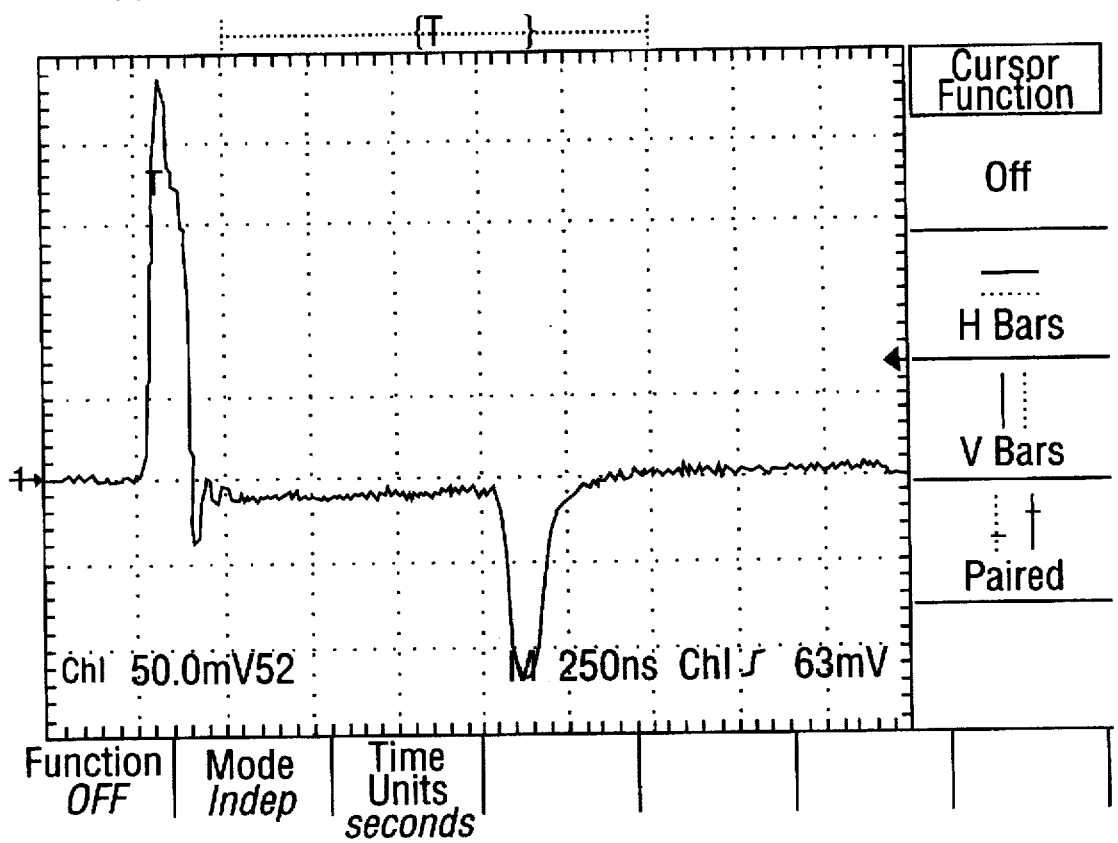
Figure 23:
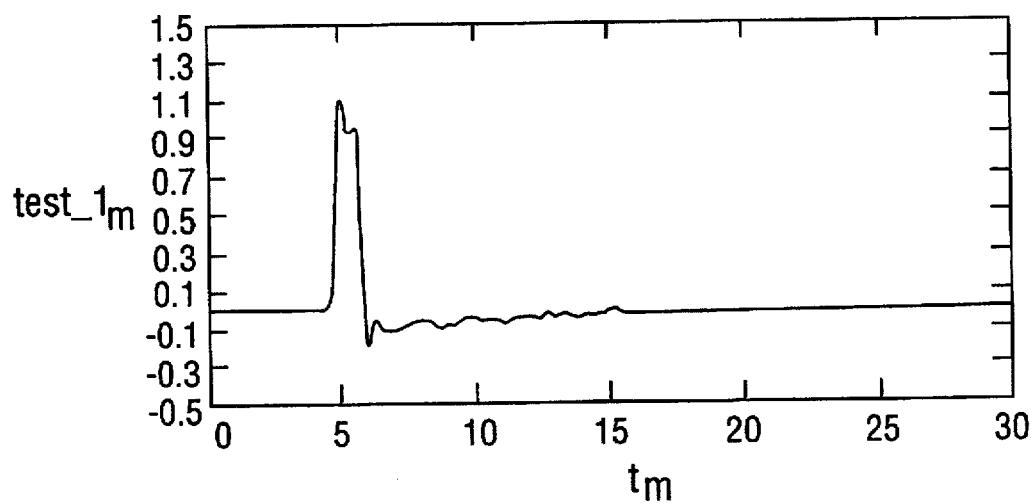

Given that this statistic and the frequency domain behavior of cat 5 UTP (terminated and not terminated) are known. Further analysis shows that a low pass filter can be used to sense the low frequency content of signals reflected back. When cat 5 UTP is terminated properly, very little signal (or energy) is reflected back. When cat 5 UTP is not terminated, the low frequency behavior changes, and allows signals with low frequency content to pass through the low pass filter. The signal flow is shown in FIG. 26. The low frequency behavioral changes from lab results are shown in FIGS. 12 to 16, while the results in FIG. 17 are from computer simulations. The time domain results from the lab and computer simulation further validates the analysis. Since the spectrum of the code is known along with the frequency behavior of the cat 5 UTP (for terminated and not terminated), the new statistic (derived by the new spectrum) can be obtained from fundamental concepts of stochastic processes. This is outlined later, while FIG. 26 shows the signal flow. By sensing the rms value of this reflected signal, the present invention is still relying on the statistical nature of the signal, but this is altered by the linear time invariant system composed of the low pass filter and the frequency domain behavior of the cat 5 UTP. So, given that the spectrum of the code, low pass filter and cat 5 UTP are known, the new statistic (or rms value) can be obtained consistently.

A distributed algorithm can be developed so that a redundant switchover can be achieved. It is a mandatory requirement in IEEE standard 802.3 u that the receiver in each end device employs a squelch circuit to sense the continuous signal. By placing the sensing circuit or status means on the transmitter of each device to detect opens and shorts, the majority of fault conditions can be detected. This will provide complete coverage of all non-symmetrical fault conditions since one side can detect all possible non-symmetrical breaks. This also provides a significant advantage because it does not rely on a communication partner for any remote fault signalling. From an interoperability point of view, the communication-partner does not need any extra requirements other than compliance to IEEE standard 802.3 u, no optional function is needed. In terms of time outs, this method will be faster since the break condition is sensed on the receive and transmit ports, thus no real time indicator or processor intervention is needed to report to higher operational layers.

Figure 8:
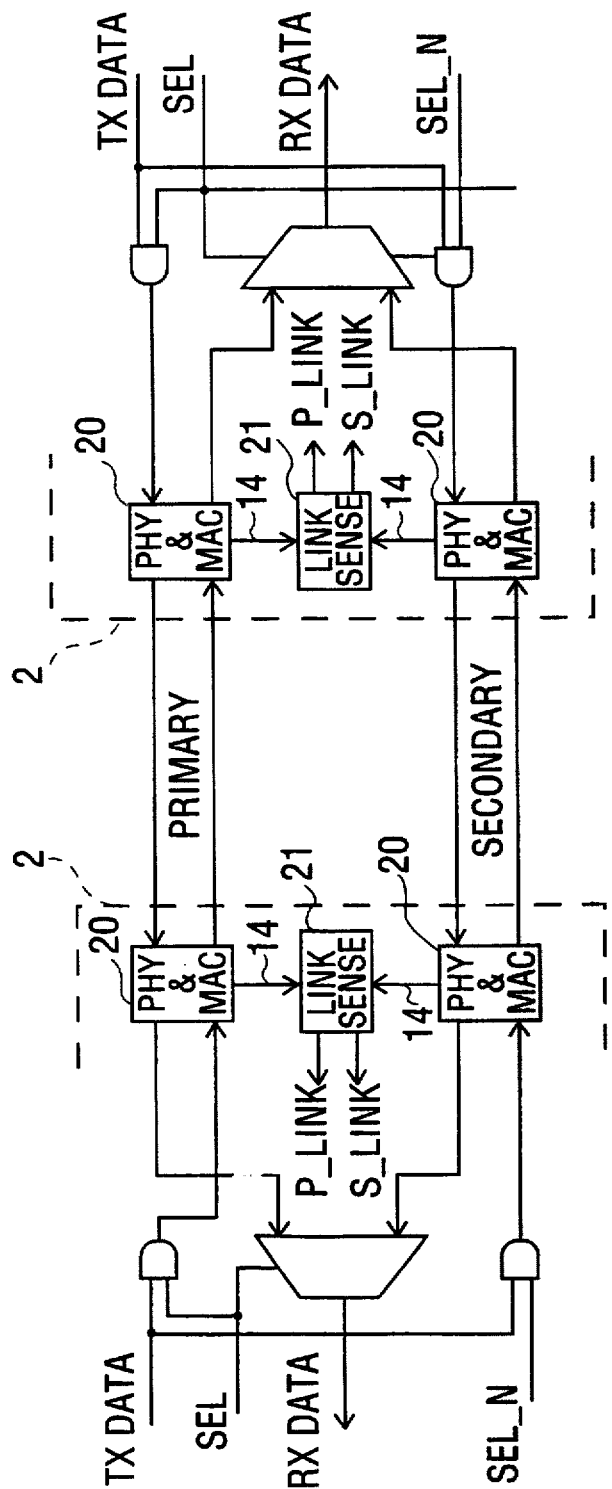
FIGS. 8 through 10 show different configuration examples of network modules with primary and redundant links.
Figure 9:
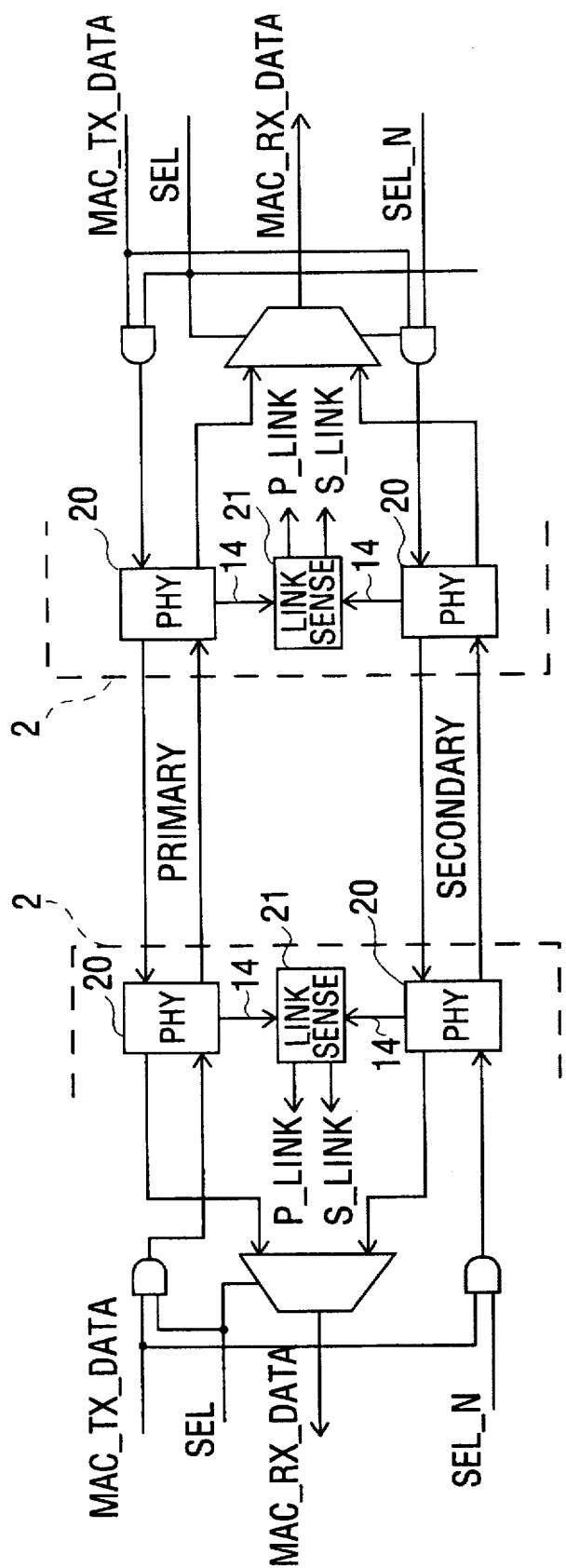
Figure 10:
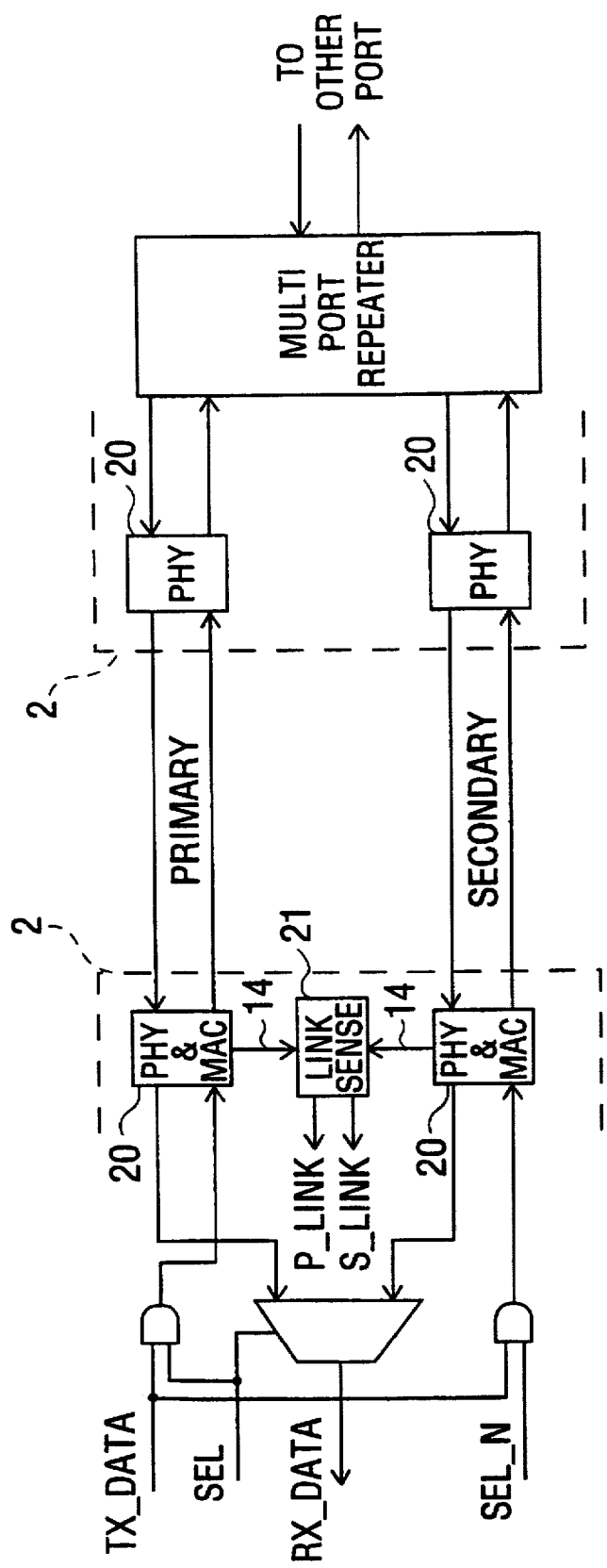

FIGS. 8–10 show configuration examples of network modules 2 with primary and redundant, or secondary, links. FIGS. 8 and 9 show two different configuration examples wherein the connection is performed in the second layer, or layer 2 of a network protocol. FIG. 10 shows a layer 2 to layer 1, Ethernet repeater, connection. Note that the layer 2 to layer 2 connection is slightly restrictive in that both end devices need the same signalling method. The reason for this is that layer 2 frames will be filtered to higher layers (this is a restriction on all switchover schemes and STA addresses this by pruning). As an alternative, layer 2 does not need to be in the bypass path since this switchover method looks only at layer 1 information. In these embodiments, each primary and secondary link has its own physical module 20 which contains the conversion means 12, the transmitter 9, the link status means 13 and receiver 7. A link sense module 21 receives the link status line 14 from the physical module 20 and in the preferred embodiment, P_link equals 1 if the primary transmit line is satisfactory and the primary receive line is satisfactory, S_link equals 1 if the secondary transmit line is satisfactory and the secondary receive line is satisfactory. The network module 2 selects the primary link for communication if P_link equals 1 or if P_link equals 0 and S_link equals 0. The network module selects the secondary link for communication if P_link equals 0 and S_link equals 1. In FIG. 9, the switchover is made at the physical layer (phy or layer 1). The MAC is not part of the redundant link.

While specific embodiments of the invention have been shown and described in detail to illustrate the application of the principles of the invention, it will be understood that the invention may be embodied otherwise without departing from such principles.

What is claimed is:

1. A process for detecting link status in a computer network, the process comprising the steps of:

converting data to be transmitted over a link into a substantially continuous signal with a substantially consistent spectrum;

transmitting said signal over the link from a first end of the link to a second end of the link;

measuring at the first end of the link a reflection signal caused by a characteristic impedance of the link and a characteristic impedance of a termination of the link;

identifying the link as satisfactory if said reflection signal represents a substantial match between the characteristic impedance of the link and the characteristic impedance of the termination of the link;

identifying the link as defective if said reflection signal represents a mismatch between the characteristic impedance of the link and the characteristic impedance of the termination of the link.

2. A process in accordance with claim 1, wherein:

the network conforms to IEEE 802 computer network standard and said identification of the link as one of defective or satisfactory conforms to the IEEE 802 standard.

3. A process in accordance with claim 1, wherein:

said transmitting of said signal over the link conforms to IEEE 802 computer network standard and said identification of the link as one of defective or satisfactory conforms to the IEEE 802 standard.

4. A process in accordance with claim 1, wherein:

said signal is sufficiently continuous, random and of a known spectrum to produce a measurable difference in said reflection signal between when said link is one of shorted and open, and when the characteristic impedance of the link is substantially matched with the characteristic impedance of the termination.

5. A process in accordance with claim 1, further comprising:

low pass filtering said reflection signal prior to said identifying of the link as one of defective and satisfactory.

6. A process in accordance with claim 1, further comprising:

transmitting said signal over a redundant link from a first end of the redundant link to a second end of the redundant link;

measuring at the first end of the redundant link a reflection signal caused by a characteristic impedance of the redundant link and a characteristic impedance of a termination of the redundant link;

identifying the redundant link as satisfactory if said reflection signal represents a substantial match between the characteristic impedance of the redundant link and the characteristic impedance of the termination of the redundant link;

identifying the redundant link as defective if said reflection signal represents a mismatch between the characteristic impedance of the redundant link and the characteristic impedance of the termination of the redundant link;

transmitting network data over the link if the link is indicated as being satisfactory;

transmitting network data over the redundant link if the link is indicated as being defective and the redundant link is indicated as being satisfactory.

7. A computer network with link status detection, the computer network comprising:

a link having a first and second end, said links having a characteristic impedance;

a receiver connected to said second end of said link, said receiver placing a load on said second end of said link, said load having a characteristic impedance, said characteristic impedance of said load being substantially matched to said characteristic impedance of said link;

pseudo random conversion means positioned at said first end of said link and for converting data to be transmitted over said link into a substantially continuous random signal with a substantially known spectrum;

transmission means positioned at said first end of said link and for transmitting said signal from said pseudo random conversion means onto said link in accordance with said characteristic impedance of said link and load;

link status means connected to said first end of said link and for measuring at said first end of said link a reflection signal caused by said characteristic impedance of said link and said load, said link status means identifying said link as satisfactory if said reflection signal represents a substantial match between the characteristic impedance of said link and said load, said link status means identifying said link as defective if said reflection signal represents a mismatch between said characteristic impedance of said link and said load.

8. A network in accordance with claim 7, wherein:

the network conforms to IEEE 802 computer network standard and said identification of said link as one of defective or satisfactory conforms to the IEEE 802 standard.

9. A network in accordance with claim 7, wherein:

said transmission means transmits said signal over said link in conformance with IEEE 802 computer network standard and said identification of said link as one of defective or satisfactory conforms to the IEEE 802 standard.

10. A network in accordance with claim 7, wherein:

said pseudo random conversion means generates said signal to be sufficiently continuous, random and of a known spectrum in order to produce a measurable difference in said reflection signal between when said link is one of shorted and open, and when said characteristic impedance of said link is substantially matched with said characteristic impedance of said termination.

11. A network in accordance with claim 7, wherein:

said link status means includes a low pass filter means for blocking high frequency components of said reflection signal prior to identifying said link as one of defective and satisfactory.

12. A network in accordance with claim 7, further comprising:

a first station positioned at said first end of said link, said first station including said pseudo random conversion means, said transmitting means and said link means;

a second station positioned at said second end of said link, said second station including said receiver;

a redundant link having a first end at said first station and a second end at said second station, said receiver at said second station placing another load with a characteristic impedance on said second end of said redundant link, said link status means measuring at said first end of said redundant link a reflection signal caused by a characteristic impedance of said redundant link and said another load, said link status means identifying said redundant link as satisfactory if said reflection signal from said redundant link represents a substantial match between said characteristic impedance of said redundant link and said characteristic impedance of said another load, said link status means identifying said redundant link as defective if said reflection signal represents a mismatch between said characteristic impedance of said redundant link and said characteristic impedance of said another load;

selection means for directing said transmission means to transmit network data over said link if said link is indicated as being satisfactory, said selection means directing said transmission means to transmit network data over said redundant link if said link is indicated as being defective and said redundant link is indicated as being satisfactory.

13. A network in accordance with claim 7, wherein:

said link includes first and second paths;

said link status means includes first and second branches, said first branch including first and second sensing loads, said second branch including a sensing load in series with said load, each of said sensing loads having an impedance substantially equal to said impedance of said load, said first path of said link being connected between said sensing load of said second branch and said load, said second path of said link being connected between another side of said load and ground, said link sensing means measuring voltage from a first point between said first and second sensing loads of said first branch to a second point between said sensing load of said second branch and said first path in order to determine if said link is satisfactory or defective.

14. A process for detecting link status in a computer network, the process comprising the steps of:

providing a link with first and second ends and a characteristic impedance;

providing a first station connected to said first end of said link;

providing a second station connected to said second end of said link, said second station having a characteristic impedance for a termination of said second end of said link;

generating communication data in said first station to be used by said second station;

converting said communication data in said first station into a substantially continuous signal with a substantially consistent spectrum;

transmitting said signal over said link from said first end of said link to said second end of said link;

measuring at said first end of said link a reflection signal caused by said characteristic impedance of said link and said characteristic impedance of said termination of said link;

identifying said link as satisfactory if said reflection signal represents a substantial match between said characteristic impedance of said link and said characteristic impedance of said termination of said link;

identifying said link as defective if said reflection signal represents a mismatch between said characteristic impedance of said link and said characteristic impedance of said termination of said link.

15. A process in accordance with claim 14, further comprising:

receiving said signal at said second end of said link by said second station;

descrambling said received signal at second end of said link into descrambled communication data similar to said communication data generated by said first station.

16. A process in accordance with claim 15, wherein:

said communication data is independent of characteristics of said link.

17. A process in accordance with claim 14, wherein:

said communication data is independent of characteristics of said link.

* * * * *